United States Patent
Lai et al.

(10) Patent No.: US 6,952,435 B2
(45) Date of Patent: Oct. 4, 2005

(54) SPECKLE FREE LASER PROBE BEAM

(76) Inventors: Ming Lai, P.O. Box 10845, Pleasanton, CA (US) 94588; Mei Juan Yuan, P.O. Box 10845, Pleasanton, CA (US) 94588

( * ) Notice: Subject to any disclaimer, the term of this patent is extended or adjusted under 35 U.S.C. 154(b) by 351 days.

(21) Appl. No.: 10/359,404

(22) Filed: Feb. 5, 2003

(65) Prior Publication Data

US 2003/0174755 A1 Sep. 18, 2003

Related U.S. Application Data

(60) Provisional application No. 60/356,228, filed on Feb. 11, 2002.

(51) Int. Cl.[7] .................. H01S 3/10; H01S 3/121; H01S 3/13; H01S 5/00; G03C 5/08; A61B 3/10
(52) U.S. Cl. ................. 372/9; 372/14; 372/15; 372/24; 372/29.023; 372/43; 372/108; 372/101; 351/212; 359/707; 430/363
(58) Field of Search ................. 372/9, 14, 15, 372/24, 29.023, 43, 101, 108, 26, 70, 75, 98, 102; 351/212; 359/707; 430/363; 606/5

(56) References Cited

U.S. PATENT DOCUMENTS

| | | | |
|---|---|---|---|
| 4,155,630 A | | 5/1979 | Ih |
| 5,233,460 A | | 8/1993 | Partlo et al. |
| 5,307,097 A | * | 4/1994 | Baker .......................... 351/212 |
| 5,621,529 A | | 4/1997 | Gordon et al. |
| 5,851,740 A | | 12/1998 | Sawyer |
| 6,081,381 A | | 6/2000 | Shalapenok et al. |
| 6,199,986 B1 | | 3/2001 | Williams et al. |
| RE37,504 E | * | 1/2002 | Lin ............................... 606/5 |

OTHER PUBLICATIONS

Lian, Junzhong et al. See atached paper J. Opt. Soc. Am. A, vol. 11 No. 7 Jul. 1994.

* cited by examiner

*Primary Examiner*—Hoanganh Le
*Assistant Examiner*—Armando Rodriguez

(57) ABSTRACT

The present invention contemplates a method and apparatus to generate a laser probe beam free of speckles. The present invention employs a holographic phase plate inserted in a laser beam path to modulate the relative phase across the beam. The holographic phase plate is designed to optimize the phase modulation across the beam while to minimize the degradation of the beam quality. The modulated laser beam has only a small and confined divergent angle and can then be refocused or collimated into a narrow and near collimated probe beam. The present invention further rotates the holographic phase plate to randomize the speckles in a time sequence. As a result, the probe beam preserves substantially the beam quality of a laser and produces substantially no speckles on image of its, intersection with a surface or material.

18 Claims, 2 Drawing Sheets

SPECKLE FREE LASER PROBE BEAM

This application claims the benefit of U.S. provisional application No. 60/356,228, filed on Feb. 11, 2002.

1. RELATED FIELD

The invention relates to a method and apparatus to generate a laser probe beam free of speckles. In particular, the invention relates to a method and apparatus to generate a laser probe beam that produces substantially no speckles when the beam is scattered from a surface or material including from an eye retina and other biological tissue.

2. BACKGROUND

Speckles are usually observed when a coherent light probe beam is scattered from a non-uniform surface or material. A typical coherent light probe beam is a laser beam. When such a coherent light probe beam hits a non-uniform surface or material, scattered lights from different scatters interfere with each other to form a speckle pattern in an observation screen.

Speckles limit the image quality of coherent light probe beam on a surface or material. In many applications, image quality of the probe beam on a surface or material can be important. For example, in an eye diagnosis instrument called wavefront analyzer, a probe beam is directed into a subject eye and intersected with the retina. The probe beam in this application needs to be narrow and near collimated such that the beam spot size is small on both the cornea and the retina. Scattered light from the retina exists from the pupil and is then collected to form, through a lenslet array called Hartmann-Shack sensor, a multiple-spots image of the probe beam on a CCD camera. In such an instrument, the centroid of each spot image shall be accurately determined in order to calculate the eye's aberration. However, speckles distort the quality of the spot image and degrade the precision of the centroid measurement.

In many applications, using a laser as a probe beam can be preferable while speckles are troublesome. A laser may be chosen as a probe beam for its superior beam quality, its incomparable brightness, its narrow bandwidth, and/or its wavelength availability. However, as a good coherent light source, laser probe beam produces most significant speckles. In the application of wavefront analyzer, for instance, a laser beam should be an ideal probe beam if there were no speckles.

A super luminescence diode (SLD) may replace a laser for a probe beam when high brightness, good beam quality, but less speckle is required. SLD probe beam has shorter coherent length than a laser beam and produces weak speckles when particularly the scatters are located at different depth along the beam. However, spatial coherence across the beam from a SLD is substantial the same as that from a laser. Therefore, speckle reduction with a SLD is not complete, especially for scattering from scatters on a surface. Besides, SLD has much limited selections in term of power, wavelengths, and vendors.

It is well known in the art that speckles can be diminished via either moving the coherent light probe beam or moving the scattering surface. In U.S. Pat. No. 6,199,986 B1 to Williams et al., a SLD probe beam is used in an experimental setup to measure eye's wave aberration and a turning mirror scans the probe beam rapidly to eliminate speckles in the Hartmann-Shack image, i.e. the multiple-spot image of the probe beam on retina. However, moving the probe beam in an eye diagnosis instrument is difficult to implement without effecting the measurement accuracy and reliability.

It is also well known in the art that speckles can be eliminated with a moving diffuser placing in the beam path of a coherent light beam. In U.S. Pat. No. 5,851,740 to Sawyer, a moving diffuser is used to reduce the speckles in a setup in which laser light is used as an illumination light source. In general, a diffuser diffuses light in a wide angle and degrades significantly the beam quality of a laser beam. Obviously, beam quality is not a design issue to consider when the laser beam is used only as an illumination light source, such as in the application described in U.S. Pat. No. 5,851,740.

3. SUMMARY

The present invention contemplates a method and apparatus to generate a laser probe beam free of speckles. The present invention employs a holographic phase plate inserted in a laser beam path to modulate the relative phase across the beam. The holographic phase plate is designed to optimize the phase modulation across the beam while to minimize the degradation of the beam quality. The modulated laser beam has only a small and confined divergent angle and can then be refocused or collimated into a narrow and near collimated probe beam. The present invention further rotates the holographic phase plate to randomize the speckles in a time sequence. As a result, the probe beam preserves substantially the beam quality of a laser and produces substantially no speckles on image of its intersection with a surface or material.

The laser beam for the above purpose can be replaced with a SLD beam or other high brightness coherent light beam. A probe beam generated in accordance with the present invention is thus similar to a laser beam having good beam quality, high brightness, and narrow bandwidth, while its spatial coherence is randomized.

In a preferred embodiment of the present invention, an apparatus for generating a speckle free probe beam comprises:

a radiation source producing a coherent light beam of predetermined beam size, power, and wavelength;

a holographic phase plate disposed in the path of said coherent light beam, modulating relative phase across said coherent light beam, and scanning rapidly and continuously across said coherent light beam to produce a phase-randomized coherent light beam; and a focal optics to refocus/collimate said phase-randomized coherent light beam into said speckle free probe beam;

wherein said speckle free probe beam is a narrow and near collimated coherent light beam with its temporal coherence unchanged but its spatial coherence randomized.

Accordingly, one objective of the present invention is to provide a new and improved laser probe beam free of speckles.

Another objective of the present invention is to provide a new and improved laser probe beam free of speckles while maintaining the features of good beam quality, high brightness, and narrow bandwidth.

A further objective of the present invention is to provide a new and improved method to convert a laser or other coherent light beam into a speckle free probe beam.

Another further objective of the present invention is to provide a new and improved probe beam for eye diagnosis or other speckle sensitive applications.

4. DRAWINGS

5. DESCRIPTION

Figure 1:
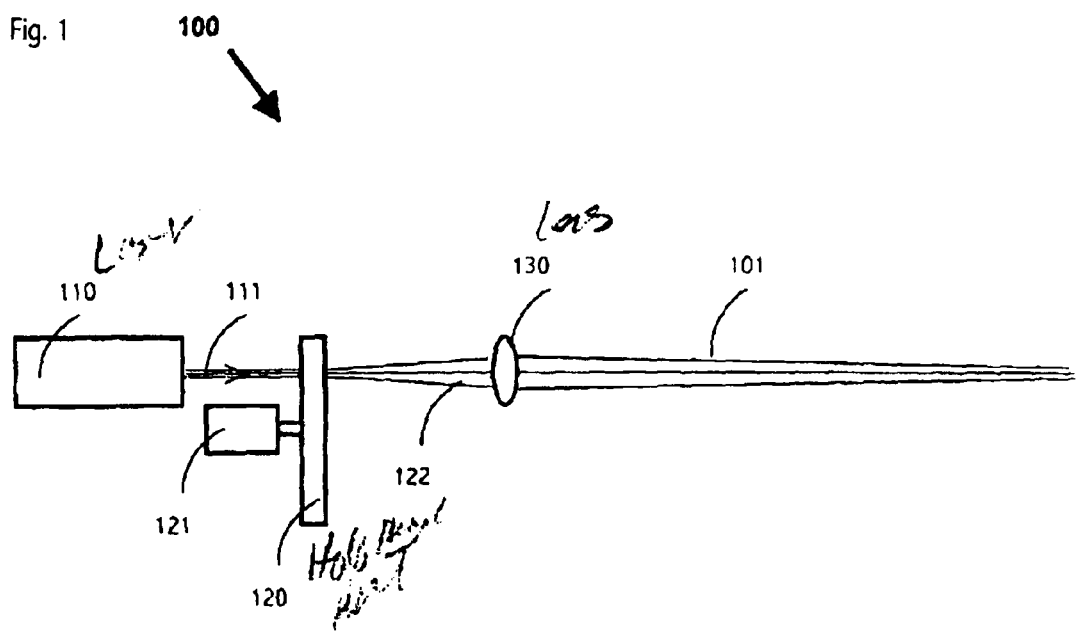
FIG. 1 is a schematic diagram of an apparatus for generating a speckle free laser probe beam in accordance with the present invention.

FIG. 1 is a schematic diagram of an apparatus 100 for generating a speckle free laser probe beam 101 in accordance with the present invention. The apparatus 100 consists of a laser source 110, a holographic phase plate 120 rotated by a motor 121, and focal optics 130.

The laser source 110 produces a narrow laser beam 111 with a predetermined beam size, power, and wavelength. Practically, the beam size is about 0.05–1 mm. The laser source 110 can be any of a variety of lasers available in the market. For many applications, the laser source 110 can be preferably a diode laser module because of its compactness, good reliability, and low cost. Diode laser modules are usually available at power level of 0.1–100 mW and wavelength ranging from blue to near infrared (350–1500 nm). Diode pumped solid state laser sources can also been good candidates for the laser source 110 for their availability in wavelength around 200 to 3000 nm and in power ranging from 0.01 mW to 10 W.

The holographic phase plate 120 is made of a holographic pattern embossed on a thin acrylic substrate or other materials. Holographic phase plate 120 is designed to optimize the phase modulation across the beam while to minimize the degradation of the beam quality. A simplified holographic phase plate 120 is a holographic diffuser with a small but well-defined diffusing angle ranges from 0.5 to 5 degrees. The holographic phase plate 120 shall have a fine and uniform holographic pattern. In particular, the structure of the holographic pattern should be much finer than the beam size of the narrow laser beam 111. Construction of holographic phase plate 120 with such specifications is known to those skilled in the art. Simplified holographic phase plate 120, i.e. a small angle holographic diffuser, can be purchased, for example, from Edmund Industrial Optics of New Jersey or Coherent of California.

The holographic phase plate 120 modulates laser beam 11 into a modulated beam 122. Microscopically, a holographic phase plate works like a spatial phase modulator and modulates the relative phase across the beam. As a result, the modulated beam 122 is modulated in both phase and intensity across the beam. With the holographic phase plate 120 at stationary, the modulated beam 122 is full of speckles itself if the modulated beam 122 is observed some distance away from the phase plate 120.

The focal optics 130 can be simply a focal lens. This focal optics 130 refocuses or collimates the modulated beam 122 into a narrow and near collimated probe beam 101. Because the divergent angle of the modulated beam 122 is small and well defined, probe beam 101 can preserve substantially the good features of a laser beam: good beam quality, high brightness, and narrow bandwidth.

The motor 121 is to rotate the holographic phase plate 120 to randomize in a time sequence the phase and intensity distribution across the modulated beam 122. As the holographic phase plate 120 scans across beam 111 speedily and continuously, the phase and intensity of the modulated beam 122 are randomized rapidly. Consequently, the modulated beam 122 or the probe beam 101 appears with a clean and uniform intensity distribution across the beam.

Figure 5:
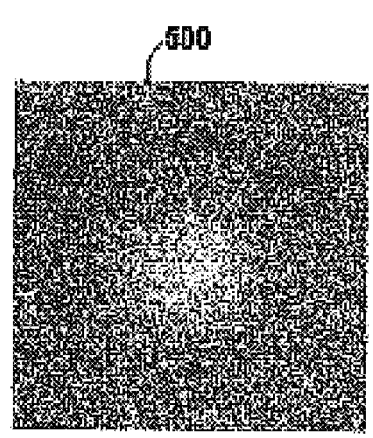
FIG. 5 shows an image taken with setup of FIG. 2 and with a laser probe beam of FIG. 1 while the holographic phase plate is rotating.

The probe beam 101 obtained with a scanning holographic phase plate 120 has thus a rapid change in phase and intensity across the beam. When this probe beam 101 is scattered from a surface or material, its speckle pattern is thus randomized quickly and washed out by time average. This way, there is no speckle pattern will be seen in any observation screen of scattered light of the probe beam 101. Consequently, the laser probe beam 101 can produce a speckle free image when the intersection between the probe beam 101 and a surface or material is imaged onto a camera, as shown in FIG. 5.

In one embodiment in accordance with the present invention, the laser source 110 is a diode laser operated at 670 nm. The laser source 110 produces a laser beam 111 of about 500 $\mu$W and a small convergence angle of 10 m-Radium. The laser beam 111 has a beam size of about 100 $\mu$m on the holographic phase plate 120. The modulated beam 122 has a full divergent angle of about 2 degree and has a spot size of about 2.4 mm on the focal lens 130, which is about 80 mm away from the phase plate 120. The holographic phase plate 120 has a diameter of about 12 mm and a thickness of about 1 mm. The motor 121 rotates at about 30 rotations per second. The focal lens 130 has a focal length of 60 mm and focuses the probe beam 101 to about 300 $\mu$m at a distance about 240 mm away from the lens 130. The probe beam 101 has thus a divergent angel as small as 10 m-Radian. This embodiment is to simulate a probe beam that may be used in an eye diagnosis instrument called wavefront analyzer, i.e. ophthalmic wavefront analyzer.

For applications in eye diagnosis instruments, either a laser or SLD source may be used to generate the speckle free probe beam. The preferred wavelength for these applications ranges from 500 to 850 nm. The probe beam may be made linearly polarized before it is projected onto the eye. The power of the probe beam on the eye shall be approximately in the range of 0.05 to 0.5 mW. The spot size of the probe beam on the cornea shall be approximately in the range of 0.3 to 1 mm.

Figure 2:
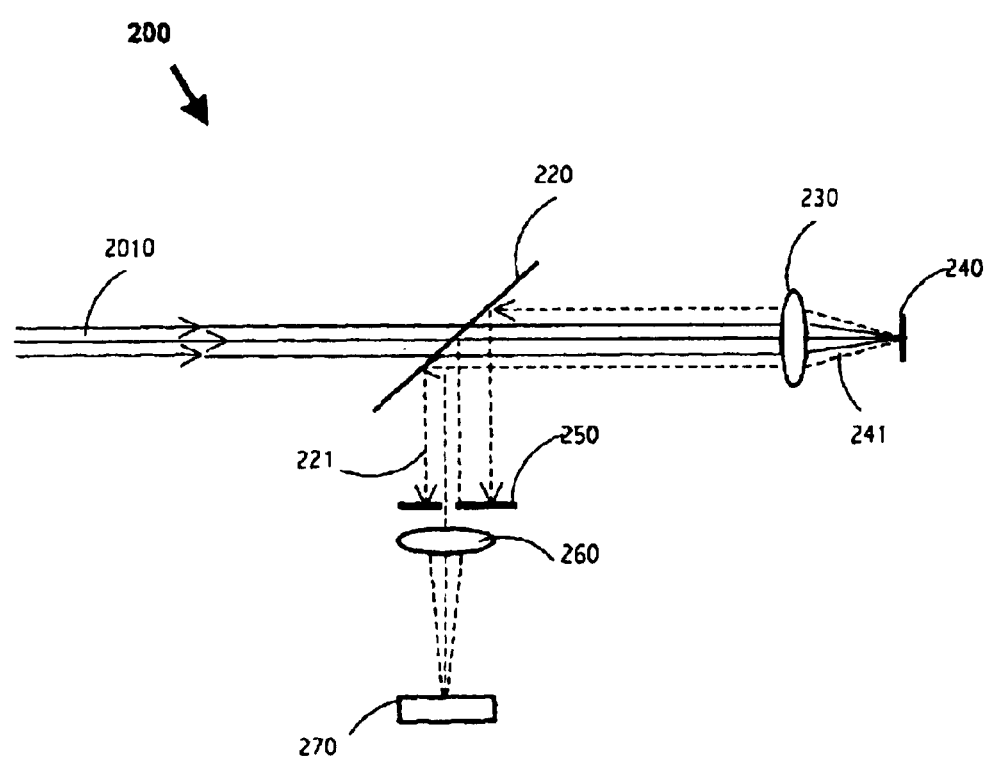
FIG. 2 is a schematic diagram of an experimental setup to take image of a probe beam on a scattering surface.

FIG. 2 is a schematic diagram of an experimental setup 200 to take image of a probe beam 201 on a scattering surface 240. In this setup 200, a narrow probe beam 201 is focused through a lens 230 onto a scattering surface 240. The scattered light 241 is reflected upon a beam splitter 220 to form a scattered beam 221. This scattered beam 221 is focused through a lens 260 onto a CCD camera chip 270. A pinhole 250 defines an aperture for the image path to the camera.

In alignment, the focal spot of the probe beam 201 on surface 240 is imaged onto the camera 270. This way, the camera 270 is located approximately at a conjugate plane of the scattering surface 240.

In one embodiment, the setup 200 is to simulate the optical layout of the image path of an eye diagnosis instrument called wavefront analyzer. The focal lens 230 used has a focal length of 22 mm to simulate the eye length. The scattering surface 240 is formed with a piece of Scotch tape to simulate the retina. The pinhole 250 has an aperture of about 1 mm to simulate the sub-aperture of a lenslet. The camera 270 is a digital camera with its focal lens 260 focused at infinite.

Figure 3:
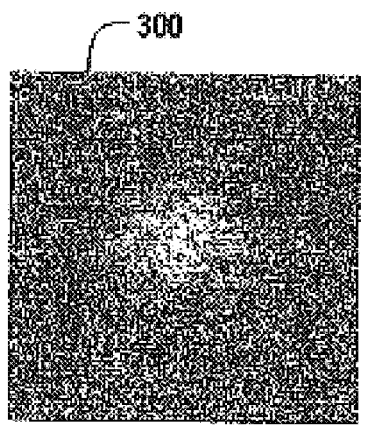
FIG. 3 shows an image taken with setup of FIG. 2 and with a laser probe beam.

FIG. 3 shows an image 300 taken with setup 200 and with a probe beam 201 delivered directly from a laser. Speckle pattern in image 300 is obvious. This speckle pattern of image 300 is typical for imaging a laser probe beam scattered from a scattering surface.

Figure 4:
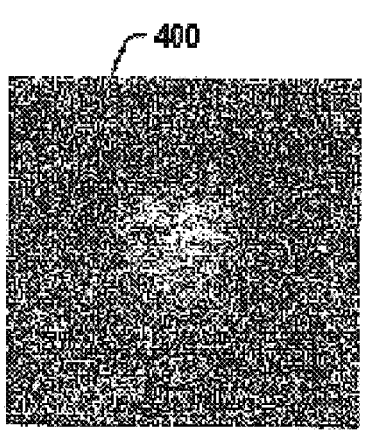
FIG. 4 shows an image taken with setup of FIG. 2 and with a laser probe beam of FIG. 1 while the holographic phase plate is stationary.

FIG. 4 shows an image 400 taken with setup 200 and with a probe beam 201 delivered from a laser probe beam 101 of FIG. 1 while the holographic phase plate 120 is stationary. In this image 400, the speckle pattern is as obvious as that in image 300. The quality of spot image of the probe beam 201 on the scattering surface 240 is substantially the same in image 300 and image 400.

FIG. 5 shows an image 500 taken with setup 200 and with probe beam 201 delivered from a laser probe beam 101 of FIG. 1 while the holographic phase plate 120 is rotating. In this image 500, there is no speckle pattern observable. The quality of spot image of the probe beam 201 on the scattering surface 240 is thus substantially improved. If the centroid of the spot image of the probe beam 201 is to be measured, spot image 500 is obviously more desirable than spot image 300 or spot image 400.

Now refer back to FIG. 1. The speckle free laser probe beam 101 itself has a smooth and uniform beam profile and is thus free of speckles. Such a smooth and uniform beam profile can be obtained even the input beam 111 does not have a smooth and uniform beam profile, e.g. laser beam from a multiple-mode laser. Therefore, the speckle free laser probe beam 101 can also be useful for applications where uniform beam profile is desirable, such as the treatment beam for photocoagulation therapy.

Furthermore, the speckle free laser probe beam 101 is substantially a laser beam with its spatial coherence randomized. As a result, the speckle free laser probe beam 101 can not be focused into a sharp point as a typical laser beam and thus reduces the possibility of retina damage should the beam is accidentally focused onto an eye retina. Therefore, speckle free laser probe beam 101 can be used for applications where eye safe is a concern, such as the treatment beam for photocoagulation therapy.

Speckle pattern is a common problem limiting the image quality of a coherent light probe beam on a scattering surface or material. Although the above embodiments are described with specific reference to an eye diagnosis instrument, the techniques of the present invention can generally generate speckle free laser probe beams for other applications. Also, the laser probe beam can be replaced with SLD or other high brightness coherent light beam. Various modifications can be made without departing from the scopes of the appended claims.

What is claimed is:

1. An apparatus for generating a speckle free probe beam comprising:
    a radiation source producing a narrow coherent light beam of predetermined beam size, power, and wavelength;
    a holographic phase plate disposed in the path of said coherent light beam and modulating relative phase across said coherent light beam;
    a mechanical mechanism scanning said holographic phase plate speedily and continuously across said coherent light beam to randomize relative phase across said coherent light beam; and
    focal optics positioned to refocus/collimate said modulated coherent light beam into a narrow and near collimated probe beam;
    wherein said narrow and near collimated probe beam forms said speckle free probe beam with its temporal coherence unchanged from said coherent light beam but its spatial coherence randomized rapidly in time.

2. The apparatus of claim 1 wherein said radiation source is a diode laser or SLD module.

3. The apparatus of claim 1 wherein said radiation source is a diode pumped solid state laser.

4. The apparatus of claim 1 wherein said radiation source is operated at a wavelength in the range of 350 nm to 1500 nm and at a power level of 0.1 mW to 100 mW.

5. The apparatus of claim 1 wherein said radiation source is a diode pumped solid-state laser operated at a wavelength in the range of 200 nm to 3000 nm and at power level ranging from 0.01 mW to 10 W.

6. The apparatus of claim 1 wherein said radiation source is a multiple-mode solid state laser.

7. The apparatus of claim 1 wherein said coherent light beam has a predetermined beam size of 0.05 mm to 1 mm on said holographic phase plate.

8. The apparatus of claim 1 wherein said holographic phase plate is a holographic diffuser with a diffusing angle within 0.5 to 5 degrees.

9. The apparatus of claim 1 wherein said focal optics is a focal lens.

10. An apparatus for generating a speckle free probe beam for an eye diagnosis instrument comprising:
    a radiation source producing a narrow coherent light beam of predetermined beam size, power, and wavelength;
    a holographic phase plate disposed in the path of said coherent light beam and modulating relative phase across said coherent light beam;
    a mechanical mechanism scanning said holographic phase plate speedily and continuously across said coherent light beam to randomize relative phase across said coherent light beam;
    focal optics positioned to refocus/collimate said modulated coherent light beam into a narrow and near collimated probe beam; and
    means to direct said narrow and near collimated probe beam into a subject eye and to intersect with the retina;
    wherein said narrow and near collimated probe beam forms said speckle free probe beam having a small spot on said retina and having its temporal coherence unchanged from said coherent light beam but its spatial coherence randomized rapidly in time.

11. The apparatus of claim 10 wherein said eye diagnosis instrument is an ophthalmic wavefront analyzer.

12. The apparatus of claim 10 wherein said radiation source is a diode laser or SLD module.

13. The apparatus of claim 10 wherein said radiation source is operated at a wavelength in the range of approximately 500 nm to 850 nm.

14. The apparatus of claim 10 wherein said speckle free probe beam has a power of approximately 0.05 mW to 0.5 mW to project into said subject eye.

15. The apparatus of claim 10 wherein said holographic phase plate is a holographic diffuser with a diffusing angle of 0.5 to 5 degrees.

16. The apparatus of claim 10 wherein said narrow and near collimated probe beam has a beam size of approximately 0.3 mm to 1 mm on said subject eye.

17. The apparatus of claim 10 wherein said speckle free probe beam has a divergent angle of approximately 10 m-Radian.

18. A method for generating a speckle free probe beam, comprising the steps of:
    providing a radiation source producing a narrow coherent light beam of predetermined beam size, power, and wavelength;
    providing a holographic phase plate;
    disposing said holographic phase plate in the path of said coherent light beam to modulate relative phase across said coherent light beam;

scanning said holographic phase plate rapidly and continuously across said coherent light beam to randomize relative phase across said coherent light beam; and providing a focal optics to refocus/collimate said modulated coherent light beam into a narrow and near collimated probe beam;

wherein said narrow and near collimated probe beam forms said speckle free probe beam with its temporal coherence unchanged from said coherent light beam but its spatial coherence randomized rapidly in time.

* * * * *